United States Patent [19]

Stanley

[11] 4,266,309
[45] May 12, 1981

[54] METHOD AND APPARATUS FOR SEPARATING HONEY FROM HONEYCOMBS

[75] Inventor: Glen L. Stanley, Des Moines, Iowa

[73] Assignee: The Jefferson Industries Company, Fairfield, Iowa

[21] Appl. No.: 125,180

[22] Filed: Feb. 27, 1980

[51] Int. Cl.³ .............................................. A01K 59/00
[52] U.S. Cl. ...................................................... 6/12 R
[58] Field of Search ...................... 6/12 R, 12 A, 12 M

[56] References Cited

U.S. PATENT DOCUMENTS

| 1,615,158 | 1/1927 | Bergquist | 6/12 R |
| 2,248,893 | 7/1941 | Parent | 6/12 R |

FOREIGN PATENT DOCUMENTS

| 19745 | 9/1935 | Australia | 6/12 R |
| 445131 | 4/1936 | United Kingdom | 6/12 A |

Primary Examiner—Robert Peshock
Assistant Examiner—Robert P. Swiatek
Attorney, Agent, or Firm—Rudolph L. Lowell; G. Brian Pingel

[57] ABSTRACT

Honeycombs are supplied to one end of an elongated wax melting tank having a heated bottom with the melted wax and honey mixture flowing from the other end of the melting tank into an upright settling tank having an upper melted wax drain and a lower honey drain and heating elements therein above the level of the mixture. The drained honey is passed into a clarifying unit maintained at a temperature less than a wax melting temperature wherein any wax particles entrained in the drained honey are removed.

6 Claims, 4 Drawing Figures

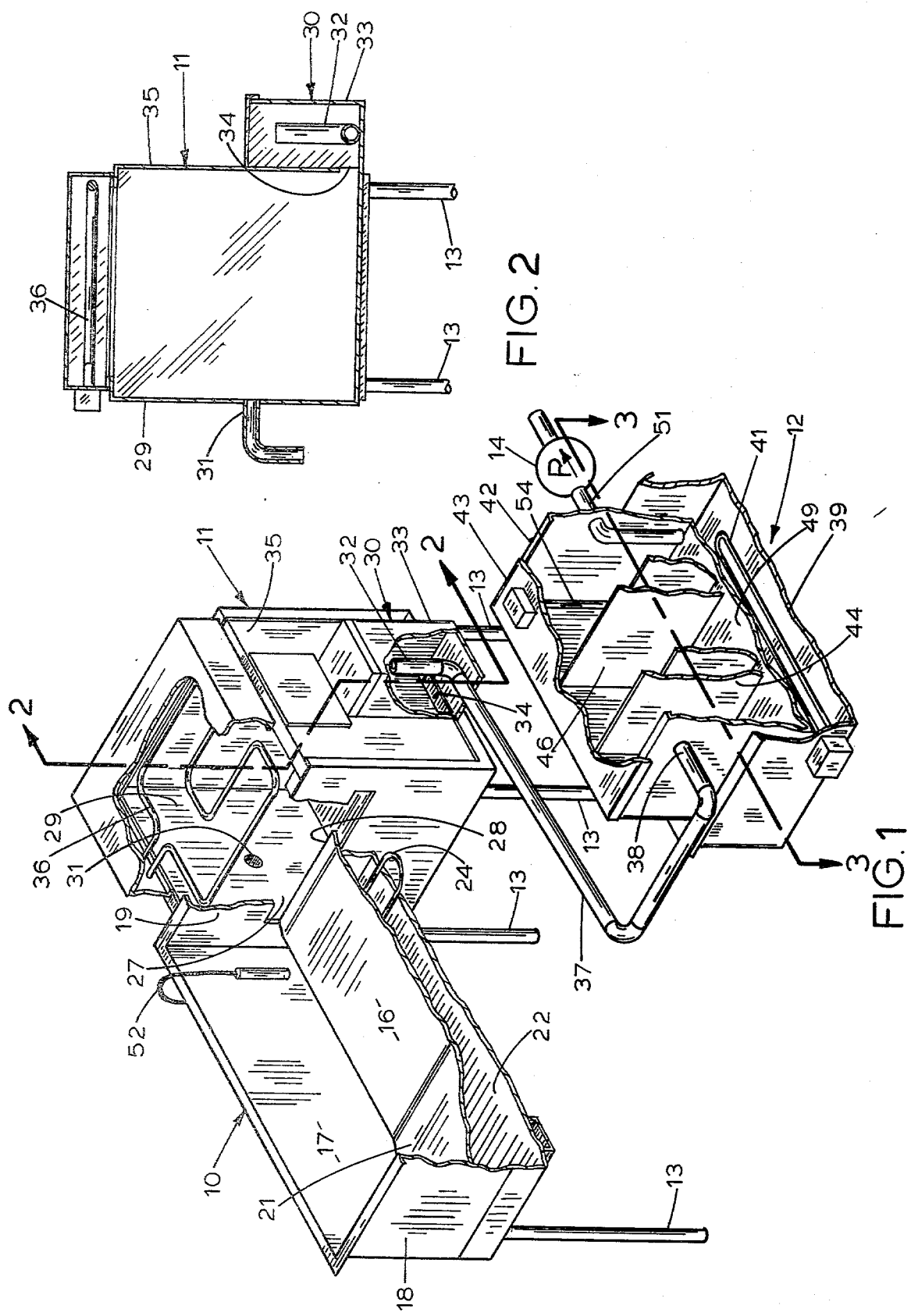

4,266,309

METHOD AND APPARATUS FOR SEPARATING HONEY FROM HONEYCOMBS

BACKGROUND OF THE INVENTION

The removal of honey from honeycombs presents particular problems in that the honey in a comb will not normally flow by gravity. Likewise, when the honey is removed from the comb, by the usual centrifuge process, further processing is required to clear the honey of wax particles for commercial use. This further processing usually requires heat which, if not properly controlled or maintained, results in a discoloration of the final honey product. To facilitate removal of the honey from a comb, the comb, and in particular the cells thereof, are uncapped. Machines for this purpose are shown in U.S. Pat. Nos. 2,261,529; 2,807,034 and 3,290,705. The patent to Bell U.S. Pat. No. 3,071,985 teaches the use of air jets for both uncapping the cells of the honeycomb and for removing the honey therefrom. This system is expensive and impractical for use by an individual beekeeper along with requiring a separate clarification of the jet removed honey for human consumption and marketing purposes.

SUMMARY OF THE INVENTION

The honey separating apparatus and method therefor is economical in cost, efficient and quiet in operation and adapted for immediate use by an individual beekeeper. The combs, with or without the caps removed therefrom, are supplied to one end of an elongated wax melting tank and the resultant honey and melted wax mixture at the other end of the tank flows into a settling tank where the melted wax is separated from the honey. The honey is then directed into a clarifying unit, for the removal of any entrained wax particles and pumped from the clarifying unit for bottling or the like. The wax melting tank and settling tank are temperature controlled to melt and maintain the wax in a melted condition for separation from the honey and to maintain the honey readily flowable for clarification and bottling. The apparatus has all parts thereof readily accessible for easy cleaning and since there are no moving parts, the apparatus is operable over a long service life with a minimum of maintenance. The temperatures of the melting tank, settling tank and clarifying unit are independently and relatively controlled to avoid any charring or cooking of the honey whereby the final honey product is clear of any discolorations.

DESCRIPTION OF THE DRAWINGS

FIG. 1 is a perspective view of the honey separating apparatus looking toward one side thereof, with parts being broken away to more clearly show its construction;

FIG. 2 is a sectional view of a settling tank forming part of the apparatus taken along the line 2—2 in FIG. 1;

DESCRIPTION OF THE INVENTION

Figures 3, 4:
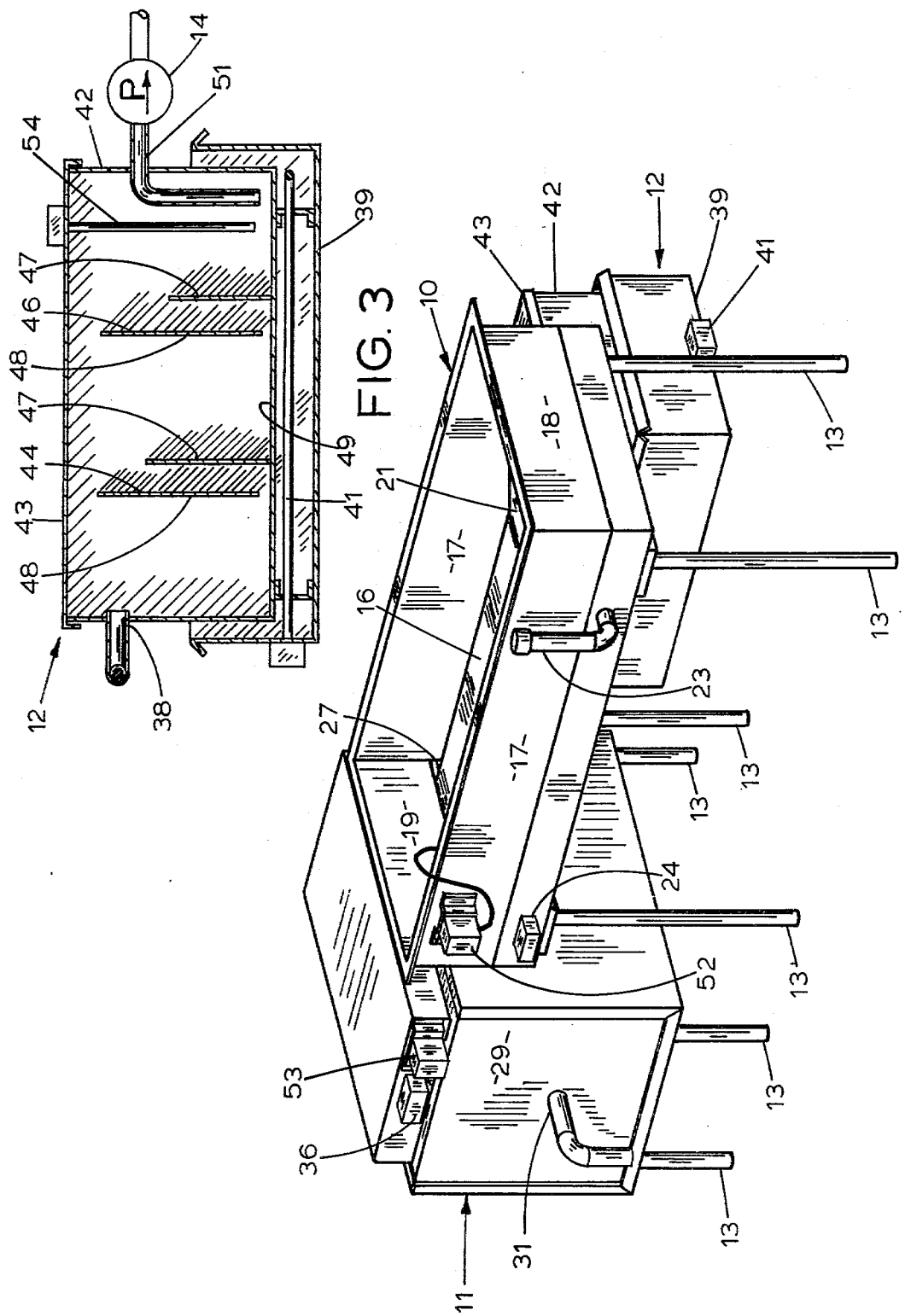
FIG. 3 is a sectional view of a honey clarifying unit which forms part of the apparatus as seen on line 3—3 in FIG. 1.
FIG. 4 is a perspective view of the honey separating apparatus looking toward the side thereof opposite the side shown in FIG. 1.

Referring to the drawings, the honey separating apparatus of this invention is shown in FIGS. 1 and 2 as including an elongated open wax melting tank 10 for receiving honeycombs, a closed upright settling tank 11 for separating the melted wax of the combs from the honey, and a clarifying unit 12 for removing from the honey any wax particles entrained therein. The melting tank 10 and settling tank 11 are supported on legs 13 and the clarifying unit is adapted to rest on the floor surface. The clear honey is drawn from the clarifying unit 12 for bottling or the like by a honey pump 14.

The melting tank 10 (FIGS. 1 and 4) is of a generally elongated rectangular shape in plan view having a bottom wall 16, side walls 17, a front wall 18 and a rear wall 19. As shown in FIG. 1, the bottom wall 16 is integrally formed at the closed end 18 of the tank with a comb receiving slide section 21. The bottom wall 16 forms the top wall of a water compartment 22. The water supplied to the compartment 22 through a fill pipe 23 is heated by an electrical heating element 24 extended transversely of the compartment 22.

The upright settling tank 11 is of a generally square shape in transverse cross section and connected to the melting tank 10 at the rear wall 19 which also forms the front wall of the settling tank 11. The common wall 19 is formed with an elongated transverse inlet opening 27 which is open to the melting tank 10 and receives therethrough an extension 28 of the bottom wall 16. A side wall 29 of the settling tank 11 has a melted wax drain 31 located transversely opposite from and above the level of a honey drain 30.

With reference to FIGS. 1 and 2, it is seen that the honey drain 30 is comprised of a standpipe 32 located within a cubicle 33 attached to the outside and at the lower end of the settling tank wall 35. The cubicle is in fluid registration with the inside of the settling tank 11 through a horizontally extended elongated opening 34 formed in the lower end of the side wall 35. A horizontally positioned heating element 36 is positioned within the upper portion of the settling tank 11 and above the wax drain 31 for maintaining the wax in a melted condition, as will appear later. The standpipe 32 has its lower end in a pipe connection 37 with a honey inlet 38 on the clarifying unit 12, for a gravity flow of honey from the settling or separation tank 11 into the clarifying unit 12.

In use, the honeycombs are manually introduced or supplied into the melting tank 10 on the slide section 21 of the bottom wall 16 which is heated over the complete area thereof by the water in the compartment 22 to a wax melting temperature. The melting tank 10 is of a length such that as the honeycombs (not shown) move downwardly on the slide section 21 and longitudinally of the bottom wall 16, the wax is melted and mixed with the honey, it being understood that the flowability of the honey is appreciably increased on being heated to a wax melting temperature. Although the honeycombs may be introduced in their entirety on the slide section 21, it is preferable that they be uncapped to expedite the flow of honey from the comb cells. In this respect, the removed caps may drop into the melting tank 10.

The melted wax and honey mixture flows over the delivery extension 28 of the bottom wall 16 and into the settling tank 11 at the inlet 27 where by virtue of the differences in the specific gravities of the wax and the honey, the honey settles toward the bottom of the tank 11 and the wax moves toward the top of the settling tank. The melted wax floating on the honey within the settling tank 11 is drained through the opening 31.

The honey moving toward the bottom of the settling tank 11 passes through the opening 34 in the wall 35 and into the cubicle 33 for gravity flow through the standpipe 32 and into the honey clarifying unit 12.

The clarifying unit is comprised of an open water tank 39 having adjacent the bottom thereof an electrical heating unit 41 (FIGS. 1 and 3). Positioned within the tank 39 and above the heating unit 41 is a baffle tank 42 provided with a cover 43. Spaced longitudinally of the baffle tank are a pair of transversely extended baffle assemblies 44 and 46, each of which is comprised of a weir plate 47 and an associated baffle plate 48 arranged upstream from a weir plate. Each baffle plate 48 is spaced upwardly from the bottom wall 49 with the weir plate 47 adjacent the inlet 38 being of a greater height than the weir plate 47 adjacent the outlet 51 of the clarifying unit. The inlet 38 is positioned above the level of the outlet pipe 51 so that the honey within the tank 42 has a gravity flow through the baffle assemblies 44. Solid wax particles that might be entrained in the honey from the settling tank 11 are thus permitted to rise in the clarifying tank for removal by skimming, when the cover 43 is removed.

In order to eliminate any discoloration of the honey as a result of being overheated, it has been found that a satisfactory clear honey, free of any discoloration, is obtained when a temperature of the water in the compartment 22 of the melting tank 10 is maintained at a temperature of from about 110° F. to about 130° F. This same temperature is maintained in the upper portion of the settling tank 11 to keep the wax in a melted condition for ready draining through the wax drain 31. The water temperature in the compartment 22 is controlled by a heat sensor unit 52 (FIG. 1) located in the mixture flow from the tank 10 at a position adjacent the settling tank 11. The temperature above the mixture in the settling tank 11 is controlled by the sensor unit 53 (FIGS. 1 and 4) located within the settling tank and above the melted wax. On separation of the honey and wax, it is only necessary to maintain the honey warm enough for ready flow and for such purpose the honey within the clarifying unit 12 is heated to a temperature of from 90° F. to 100° F. by the water in the water tank 39. This temperature of the warming water is maintained and controlled by a sensing unit 54 located in the cover 43 and arranged to sense the temperature of the honey adjacent the outlet 51.

In one embodiment of the invention, the melting tank 10 is about eight feet long, six inches high and one and one-half feet wide; the water compartment 22 has a height of about two inches and the slide section 21 of the tank bottom wall 16 has a length of about fourteen inches. The settling tank is about three feet square and the wax drain 31 is located about ten inches above the bottom of the tank 11 and the top of the standpipe 32 is located at a height of about nine inches above the bottom wall of the settling tank. In this embodiment, the clarifying unit 12 is about four feet long and sixteen inches high with the baffle assemblies 44 within the baffle tank 42 longitudinally spaced about fifteen inches from each other and from adjacent ends of the tank 42. The baffle plates 48 are spaced approximately one-half inch from the bottom of the tank 42 and about three-quarters of an inch below the cover plate 43 with the weir plate 47 adjacent the inlet 38 having a height about one inch higher than the weir plate adjacent the outlet 51.

Although the invention has been described with respect to a preferred embodiment thereof, it is to be understood that it is not to be so limited since changes and modifications can be made therein which are within the full intended scope of this invention as defined by the appended claims.

I claim:
1. Apparatus for separating honey from honeycombs including:
    (a) an elongated melting tank for receiving the honeycombs having a bottom wall and end walls, said honeycombs being supplied to the tank adjacent one end thereof,
    (b) means for heating the bottom wall of the melting tank to a wax melting temperature to provide for the flow of a honey and melted wax mixture from said one end to the opposite end thereof,
    (c) an upright settling tank at said opposite end of the melting tank for receiving said mixture, with the honey in the mixture settling toward the bottom of the settling tank and the melted wax in said mixture accumulating adjacent the upper end thereof,
    (d) a wax drain for removing the melted wax from the settling tank,
    (e) a honey clarifying unit having an inlet portion and an outlet portion,
    (f) a honey drain on the settling tank located below the level of said melted wax drain for draining the honey therefrom to said inlet portion, and
    (g) means for withdrawing the honey from said outlet portion.
2. The honey separating apparatus according to claim 1 including:
    (a) control means for said heating means to maintain the bottom wall of the receiving tank at a temperature of from about 110° F. to about 130° F., said bottom wall having a length such that substantially all of the wax in said honeycombs is melted during movement thereof longitudinally across the melting tank.
3. The honey separating apparatus of claim 2, including:
    (a) means for heating the settling tank at a temperature to maintain the wax therein in a melted condition and
    (b) means for heating the honey adjacent the outlet portion of the clarifying unit to a temperature of from about 90° F. to 100° F.
4. The honey separating apparatus of claim 3, including:
    (a) a liquid container coextensive with and carried on the underside of said bottom wall, and
    (b) said heating means for the melting tank including an electrical heating unit immersed in the liquid in said container to heat the same,
    (c) said settling tank having a closed upper end, and
    (d) the heating means for maintaining the wax in the settling tank in a melted condition being located within the upper portion of the settling tank above the level of honey and melted wax mixture therein.
5. The honey separating apparatus of claim 1, wherein:
    (a) said honey drain includes a standpipe associated with the settling tank having an upper end located below the level of the melted wax drain, and
    (b) a lower end adjacent the bottom of the settling tank.

6. The honey separating apparatus of claim 1, wherein:
(a) the honey clarifying unit includes an elongated baffle tank having a series of upright baffle assemblies spaced longitudinally thereof,
(b) said baffle assemblies being of progressively decreased height from said inlet portion to said outlet portion to provide for a gravity flow of the honey and the accumulations on the honey of any wax particles entrained therein from said settling tank.

* * * * *